US008784604B2

(12) United States Patent
Oldroyd et al.

(10) Patent No.: US 8,784,604 B2
(45) Date of Patent: Jul. 22, 2014

(54) METHOD AND APPARATUS FOR OUT-OF-AUTOCLAVE ADHESIVE SHEAR BONDING OF STRUCTURES

(75) Inventors: Paul Oldroyd, Azle, TX (US); James Donn Hethcock, Colleyville, TX (US); Robert Clive Fews, Beaconsfield, CA (US)

(73) Assignee: Textron Innovations Inc., Providence, RI (US)

( * ) Notice: Subject to any disclaimer, the term of this patent is extended or adjusted under 35 U.S.C. 154(b) by 456 days.

(21) Appl. No.: 13/272,393

(22) Filed: Oct. 13, 2011

(65) Prior Publication Data
US 2013/0092792 A1 Apr. 18, 2013

(51) Int. Cl.
*B32B 37/00* (2006.01)
*B29C 65/00* (2006.01)
*B64C 1/12* (2006.01)

(52) U.S. Cl.
CPC ............... *B64C 1/12* (2013.01); *B29C 66/5221* (2013.01)
USPC .......................... 156/307.3; 156/293; 156/297

(58) Field of Classification Search
CPC ........................................................ B64C 1/12
USPC ............. 156/293, 294, 295, 297, 299, 307.3, 156/307.7; 244/119, 123.1, 131, 132
See application file for complete search history.

(56) References Cited

U.S. PATENT DOCUMENTS 3,937,641 A * 2/1976 Kushner et al. ................. 156/87
7,037,568 B1 * 5/2006 Rogers et al. ................. 428/119
2007/0011970 A1 1/2007 Hethcock et al.

FOREIGN PATENT DOCUMENTS

WO 2008022201 A2 2/2008
WO 2009078871 A1 6/2009

OTHER PUBLICATIONS

Office Action issued by the European Patent Office in related European patent application 11194997.0, mailed May 31, 2013, 3 pages.
Extended European search report Ref. No. JL61757P.EPP from Application No. 11194997.0-2124, issued by the European Patent Office on Mar. 28, 2012.
Office Action issued by the Canadian Patent Office in related Canadian patent application 2,788,205, mailed Aug. 12, 2013, 2 pages.

* cited by examiner

*Primary Examiner* — John Goff
(74) *Attorney, Agent, or Firm* — James E. Walton

(57) ABSTRACT

The shear bonding method is configured to facilitate bonding of structures in an out-of-autoclave environment. The shear bonding method includes bonding a plurality of frame members to the interior of a tapered tailboom. The frames are located on a bayonet type tool. An adhesive pack is applied to each frame. The bayonet type tool is inserted into the tailboom until the adhesive packs come into contact with the interior walls of the tailboom. Conductive heating tiles are applied to the tailboom. The conductive heating tiles are controlled to achieve and maintain viscosity of the adhesive packs. During this period the bayonet tool is actuated so that the frames are translated in relation to the tailboom. The heating tiles are then controlled to achieve and maintain the adhesive at a requisite curing temperature.

18 Claims, 11 Drawing Sheets

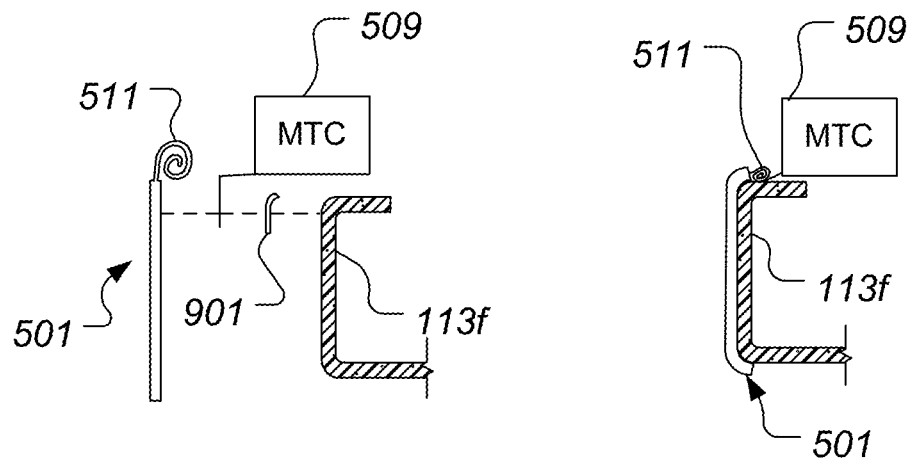
FIG. 9A   FIG. 9B
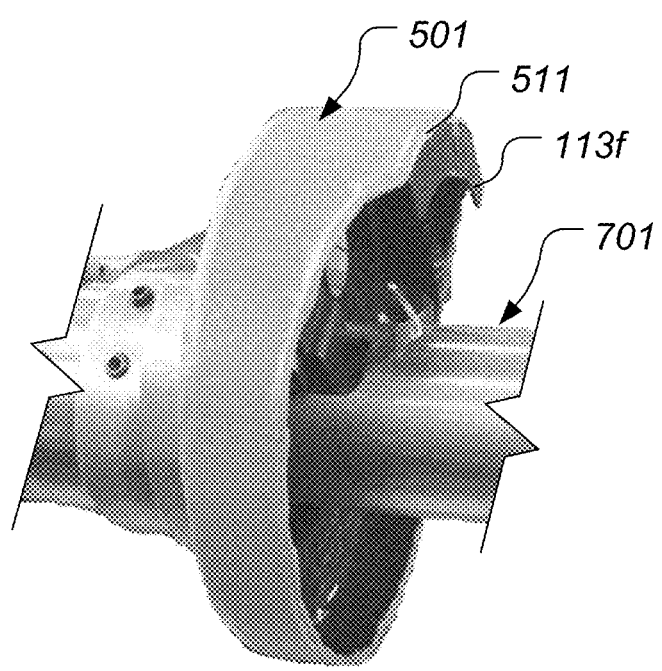
FIG. 10

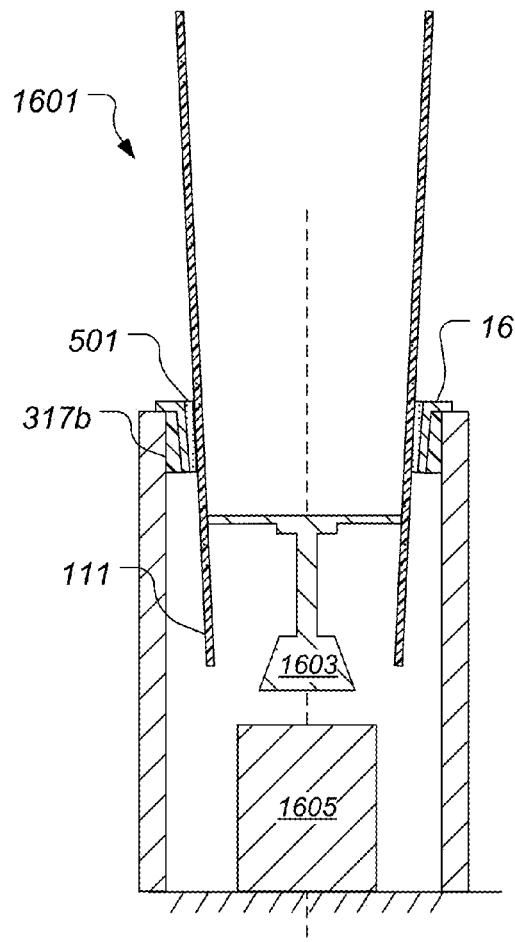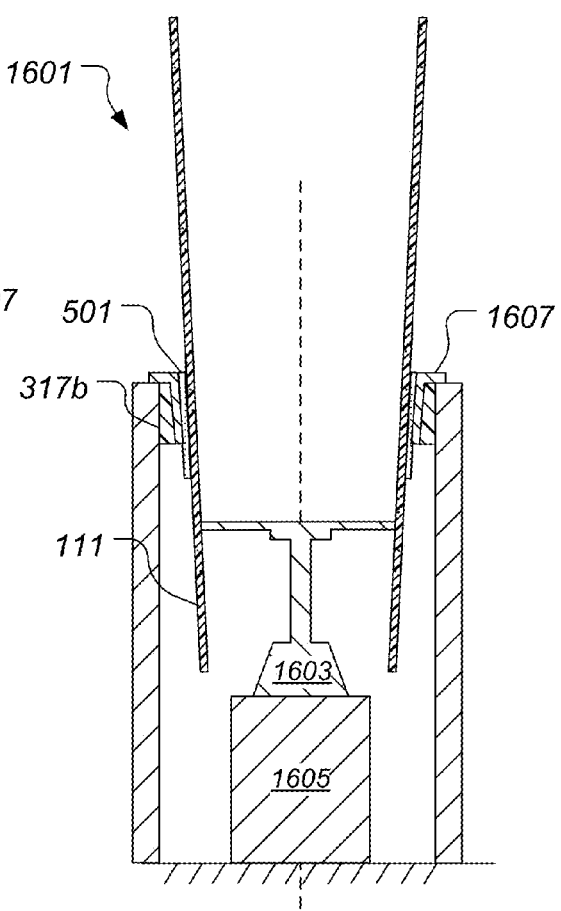
FIG. 16A  FIG. 16B

METHOD AND APPARATUS FOR OUT-OF-AUTOCLAVE ADHESIVE SHEAR BONDING OF STRUCTURES

BACKGROUND

1. Field of the Invention

The present application relates to an adhesive bond assembly of structures. In particular, the present application relates to using an adhesive shear bonding method for aerospace structures in an out-of-autoclave environment.

2. Description of Related Art

Typically, adhesive bonding of composite structural members require heat and pressure for final curing. One method of achieving the requisite heat and pressure is to draw a vacuum on the assembly while inside an autoclave. The autoclave subjects the assembly to heat and pressure, thereby curing the adhesive in the assembly. However, autoclave curing of adhesives in structural assemblies is not always feasible. For example, the size of the assembly may prohibit an autoclave cure. Further, the geometry of the structural assembly may prevent the access required to install a vacuum bag around the bonding area. Furthermore, heat sensitive materials present in the assembly may make an autoclave cure undesirable.

Although the developments in curing of adhesive in structural components have produced significant improvements, considerable shortcomings remain.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIGS. 9A and 9B are a stylized side views of the adhesive pack being applied to a frame, according to the preferred embodiment of the present application;

FIG. 10 is a perspective view of an adhesive pack applied to a frame, according to the preferred embodiment of the present application;

FIGS. 16A and 16B are stylized cross-sectional views of a bond fixture assembly, according to an alternative embodiment of the present application.

Figure 1:
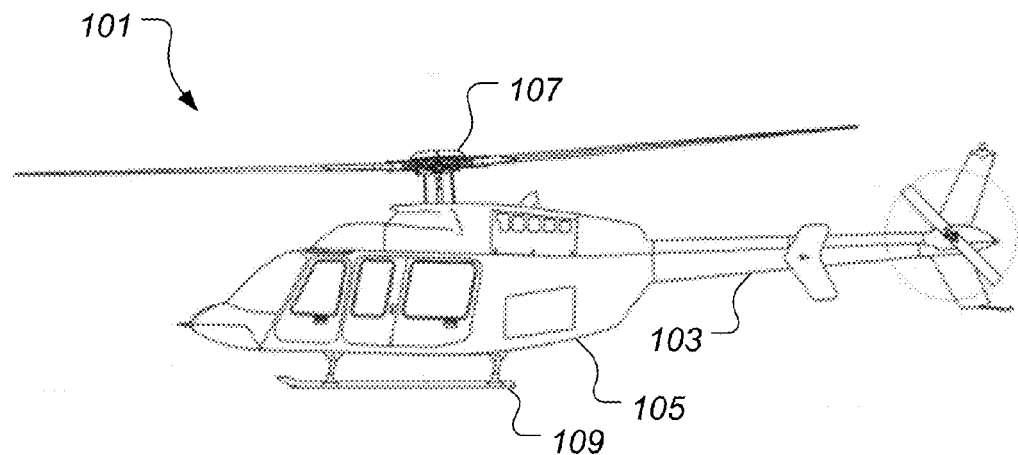
FIG. 1 is a side view of a rotorcraft according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The shear bonding method of the present application is configured to facilitate bonding of structures in an out-of-autoclave environment. In one embodiment, the shear bonding method is configured to bond a plurality of frame members to the interior of a tapered tailboom. The frames are located on a bayonet type tool. An adhesive pack having a plurality of adhesive film layers is applied to the faying surfaces of each frame. The bayonet type tool is inserted into the tailboom until the adhesive packs come into contact with the interior walls of the tailboom. Conductive heating tiles are applied to the exterior of the tailboom. The conductive heating tiles are controlled to first achieve and maintain viscosity of the adhesive packs. During this period the bayonet tool is actuated so that the frames are translated in relation to the tailboom, thereby smearing the viscous adhesive and creating positive mechanical pressure at the bondline until the frames are located in the final position. The heating tiles are controlled to achieve and maintain the adhesive at a requisite curing temperature.

Referring to FIG. 1, an aircraft 101 is illustrated. Aircraft 101 includes a tailboom 103 attached to a fuselage 105. Aircraft 101 further includes a rotor system 107 and a landing gear 109. In the illustrated embodiment, tailboom 103 has an approximately conical shape with the forward diameter being larger than the aft diameter.

Figure 2:
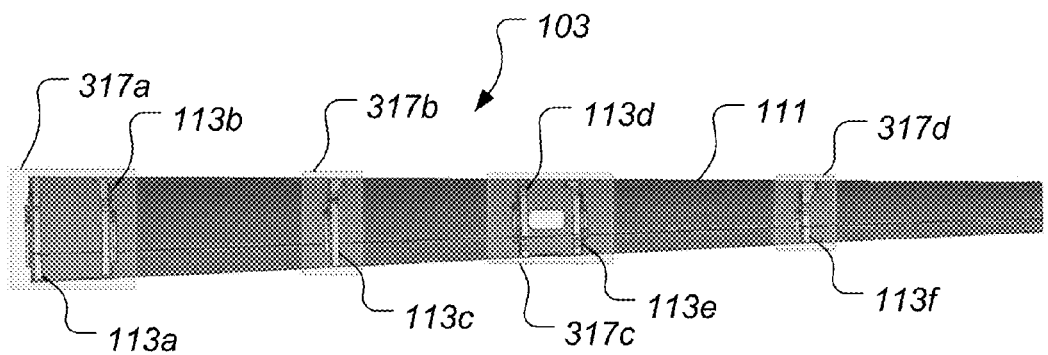
FIG. 2 is a partially stylized side view showing interior ribs and tailboom of the rotorcraft of FIG. 1.

Referring to FIG. 2, tailboom 103 includes a tailboom skin 111 and a plurality of tailboom frames 113a-113f. In the illustrated embodiment, tailboom skin 111 is a conical segment approximately twelve feet long. The internal diameter of tailboom skin 111 at the forward end is approximately fifteen inches, while the internal diameter at the aft end is approximately seven inches. Tailboom skin 111 is preferably is a monolithic carbon epoxy composite part fabricated used an inner mould line technique. Each frame 113a-113f is preferably a woven carbon epoxy composite configured to provides structural reinforcement of tailboom skin 111. It should be fully appreciated that the configuration of tailboom 103 is implementation specific. Tailboom skin 111 and frames 113a-113f may take on a wide variety of geometries and materials.

Figure 3:
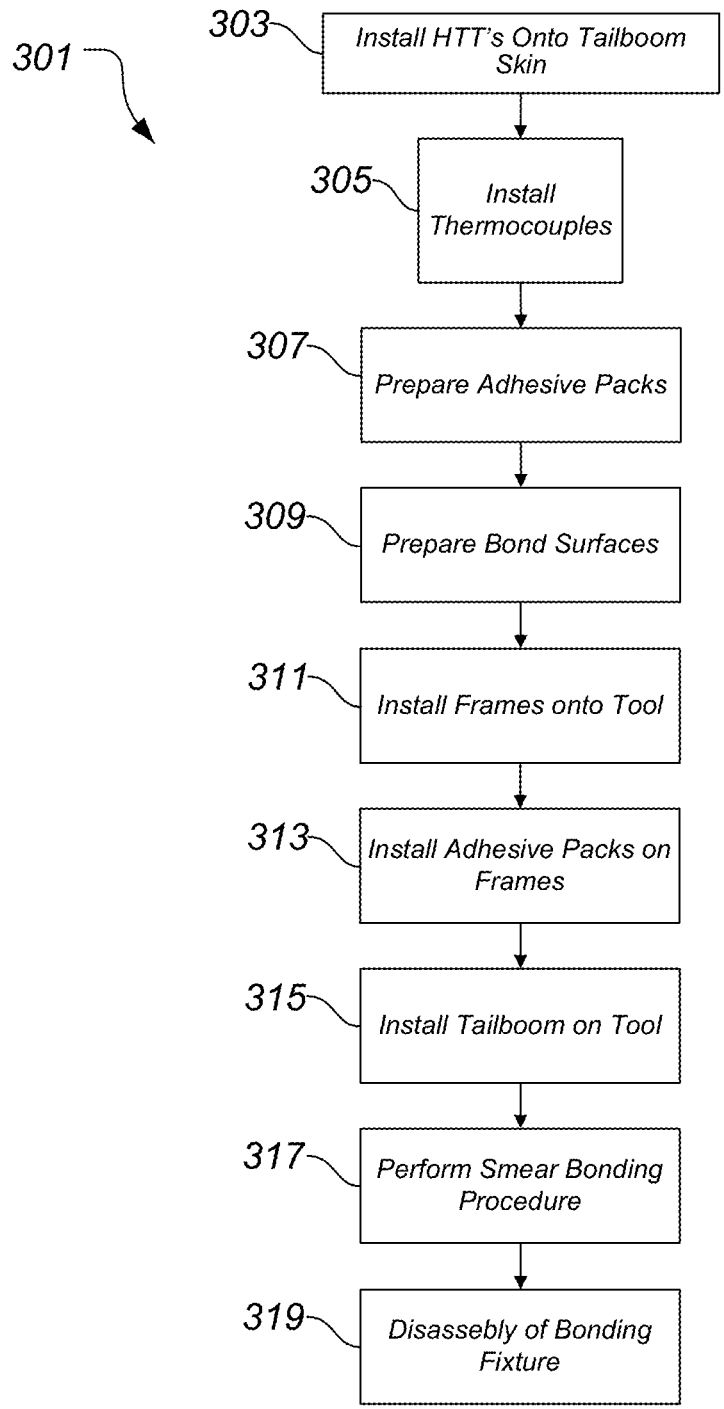
FIG. 3 schematic block diagram of the shear bond method, according to the preferred embodiment of the present application.

Referring to FIG. 3, frames 113a-113f are bonded to the interior surface of tailboom skin 111 using a shear bond method 301. Shear bond method 301 includes installing heat transfer tiles (HTT's) onto tailboom skin 111, in a step 303. A step 305 includes installing thermocouples in order to control and monitor temperatures during the procedure. A step 307 includes preparing adhesive packs. A step 309 includes preparing the bond surfaces of frames 113a-113f and tailboom skin 111. A step 311 includes installing frames 113a-113f onto tool 701. A step 313 includes installing the adhesive packs 501 onto the frames 113a-113f. A step 315 includes installing tailboom skin 111 onto tool 701. A step 317 includes performing the smear bonding procedure. A step 319 includes disassembling tailboom 103 from tool 701. Each of the aforementioned steps is described further herein.

Step 303 includes installing one or more HTT's 317a-317d onto tailboom skin 111. Referring again briefly to FIG. 2, HTT's 317a-317d are schematically illustrated. Each HTT 317a-317d includes a flexible conductive/resistive material configured to controllably provide heat to a zone of the tailboom skin 111, proximate the bonding areas. In one embodiment, each HTT 317a-317d includes a plurality of strip zone heaters attached to a heat sink. In such an embodiment, the heat sink is a beryllium copper sheet. As shown in FIG. 2, frames 113a-113f of close proximity are configured with a single HTT, such as HTT 317a for example. It should be appreciated that HTT's 317a-317d may be any heat source capable of providing heat to the bondline between frames 113a-113f and tailboom skin 111. Further, HTT's 317a-317d may not only be located exterior to skin 111, but may be located on the interior of skin 111 or frames 113a-113f.

Figure 4:
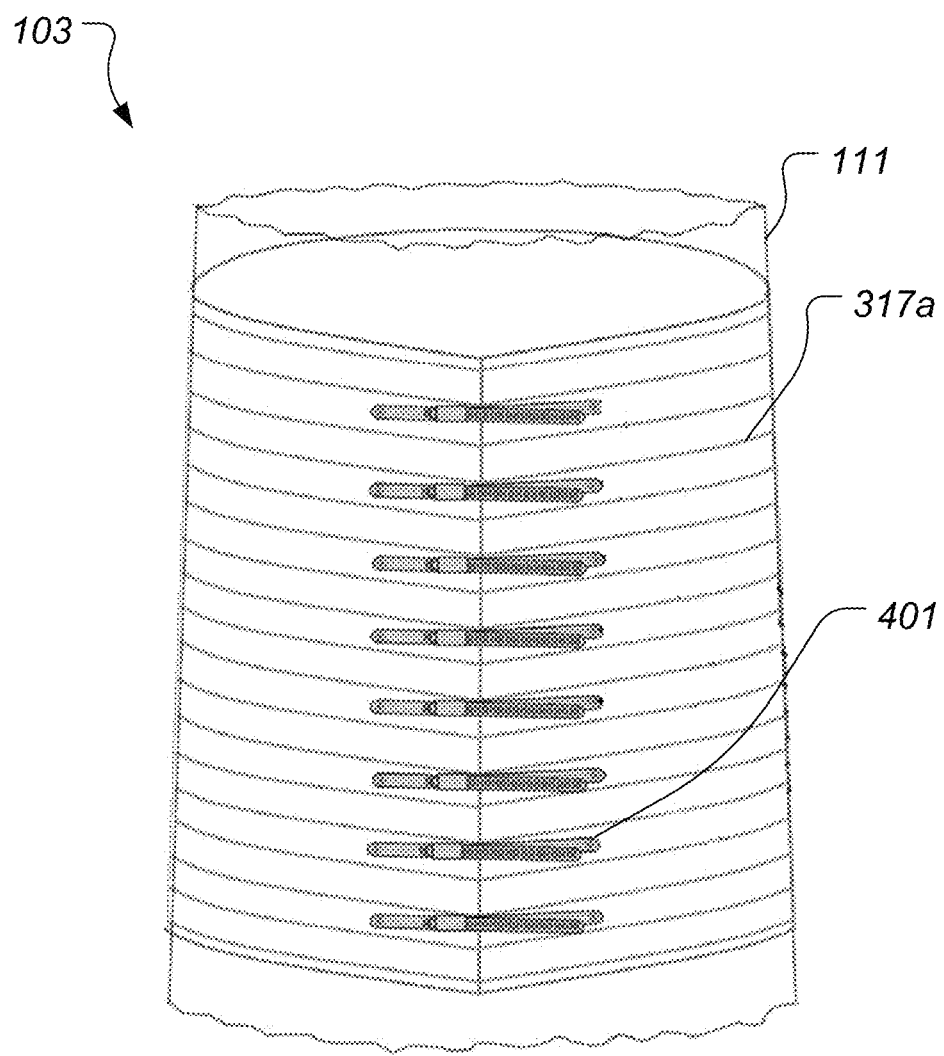
FIG. 4 is a top view of a tailboom skin, according the preferred embodiment of the present application.

Referring to FIG. 4, HTT 317a is illustrated as installed on tailboom skin 111. One or more clamps 401 may be used to secure HTT 317a around tailboom skin 111. Insulation blankets may be used around each HTT 317a-317d to more efficiently facilitate the heat transfer from each HTT 317a-317d to the bonding area, in part by reducing the amount heat escaping.

Step 305 includes installing one or more thermocouples in order to control and monitor temperatures during the procedure. In the preferred embodiment, one or more control thermocouples (CTC) are attached to each HTT 317a-317d and configured to provide a HTT controller temperature information so that the HTT controller can accurately control each HTT 317a-317d. Additionally, one or more heater thermocouples (HTC) are preferably attached to each HTT 317a-317d and configured to control the temperature of each HTT 317a-317d. Further, one or more monitor thermocouples (MTC) are positioned in the bondline between each frame 113a-113f and tailboom skin 111. In contrast to the CTC's, the MTC's are not used to control HTT's 317a-317d. Rather, the MTC's are used to monitor temperatures in the bondlines. In one embodiment, a maximum allowable temperature alarm can be assigned to a MTC. If an MTC alarm is assigned, and the maximum allowable temperature is exceeded, the alarm is triggered and the event is logged.

Figure 5:
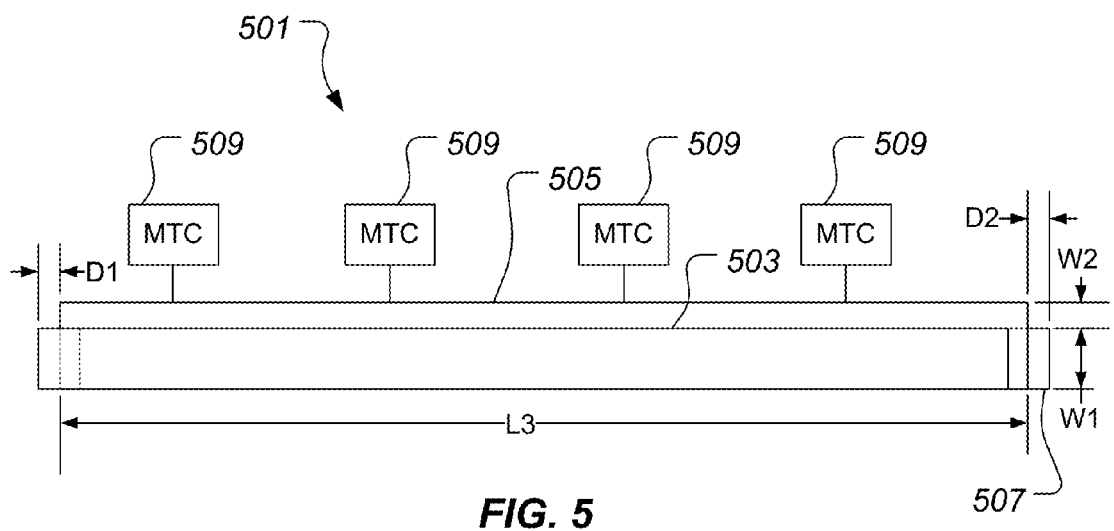
FIG. 5 is a partially stylized top view of an adhesive pack, according to the preferred embodiment of the present application.
Figure 6:
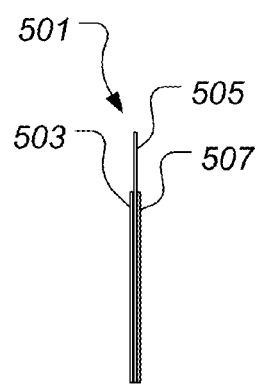
FIG. 6 is a partially stylized side view of the adhesive pack from FIG. 5, according to the preferred embodiment of the present application.

Step 307 includes preparing a customized adhesive pack for each frame 113a-113f. The length and width of the adhesive pack is at least partially dependent upon the geometry of relative frame 113a-113f. Referring to FIGS. 5 and 6, an exemplary adhesive pack 501 is illustrated. For clarity, adhesive film pack 501 is described herein with regards to frame 113f; however, the discussion herein with regard to adhesive pack 501 is equally applicable to adhesive packs configured for frames 113a-113e. In the preferred embodiment, adhesive pack 501 includes plurality of adhesive film plies, such as adhesive film plies 503, 505, and 507. Each adhesive film ply 503, 505, and 507 is cut to a length L1, the length L1 corresponding with a circumference of a frame member, such as frame 113f. Adhesive film plies 503 and 507 are cut to a width W1, the width W1 being configured to cover the bonding surface of frame 113f, while also providing surplus that can be trimmed to the desired configuration. In the exemplary embodiment, W1 is approximately 2.6 inches. The width of adhesive ply 505 is equal to W2 in addition to W1. Further, W2 is approximately 0.5 inches so that a noodle 511 is formed from ply 505. As discussed further herein, noodle 511 is a rolled up portion of adhesive film ply 505 that forms a fillet at the edge of frame 113f during bonding. Adhesive film plies 503, 505, and 507 arranged such that the end portions partially overlap when applied on frame 113f. Plies 503 and 503 are offset by distances D1 and D2, respectively, which in the preferred embodiment is approximately one inch.

In the preferred embodiment, adhesive film plies 503, 505, and 507 are a FM300-1K adhesive film marketed under the trade name Cytec-Fiberite Incorporated. It should be appreciated that adhesive pack 501 may include any type of adhesive film having the requisite bond strength for the implementation. Further, it should be appreciated that adhesive pack 501 may be formed from a single adhesive film ply, as well as any plurality of adhesive film plies. Further, in an alternative embodiment, adhesive pack 501 may be formed from paste adhesive. In such an embodiment, the use of paste adhesive may eliminate the need to apply and monitor heat in the bond area.

Step 309 includes preparing the bond surfaces of tailboom skin 111 and frames 113a-113f. The removal of surface contaminants from the bond surfaces promotes adhesion between the adhesive and the bond surfaces. Surface contaminants may be removed using a cheesecloth and isopropyl alcohol.

Further, the bond surfaces may be mechanically abraided with an abrasive, such as an air-propelled grit-blasting gun. Hand abrading may also be performed using sandpaper. Further, bond surfaces may be cleaned using a solvent. It should be appreciated that a variety of known methods of cleaning the bond surfaces may be used in step 309. Further, step 309 may also include plasma treating the bonding surfaces to promote adhesion.

Figure 7:
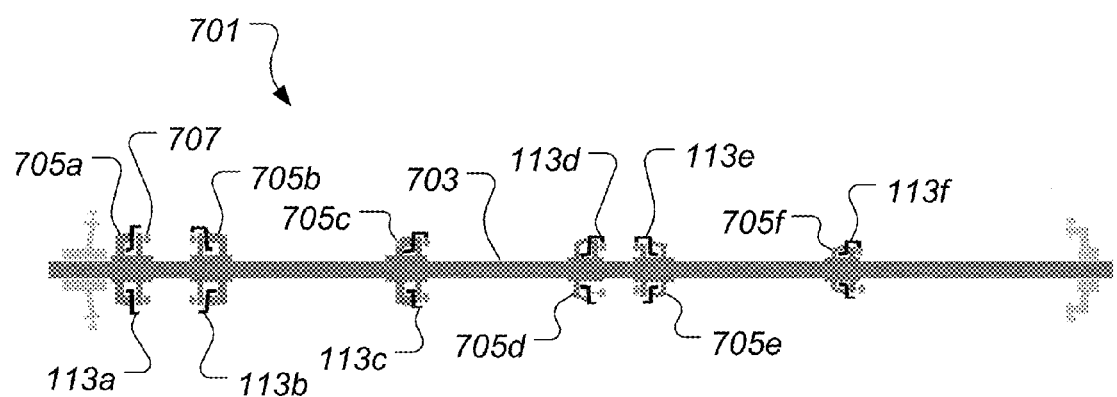
FIG. 7 is a cross-sectional view of a tool for use in the shear bond method, according to the preferred embodiment of the present application.
Figure 8:
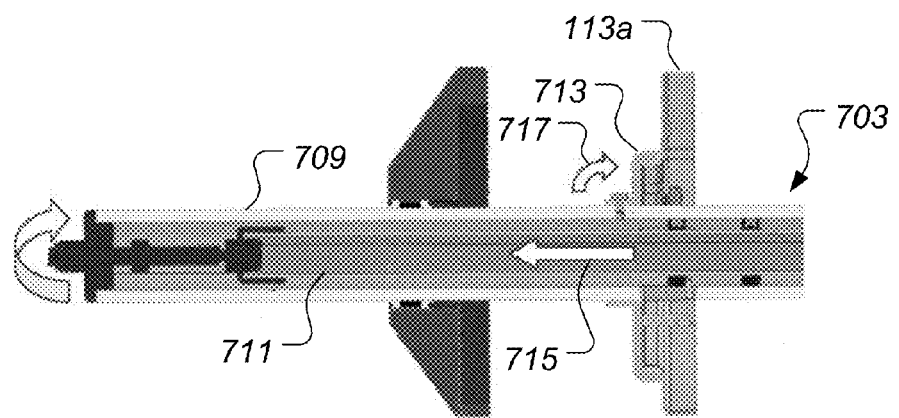
FIG. 8 is a partially stylized cross-sectional view of the tool in FIG. 7, according to the preferred embodiment of the present application.

Step 311 includes installing frames 113a-113f onto a tool 701. Referring also to FIG. 7, tool 701 is a bayonet styled tool having a central shaft 703. Tool 701 includes a plurality of fixtures 705a-705f configured to secure frames 113a-113f, respectively. It should be appreciated that frames 113a-113f may be secured to fixtures 705a-705f in a variety of configurations. In one embodiment, each frame 113a-113f is secured to the corresponding fixture 705a-705f with a fastener, such as a screw 707. Referring also to FIG. 8, frame 113a is illustrated as being secured to shaft 703 with a collapsible frame clamp 713. In such an embodiment, shaft 703 includes an outer shaft 709 and a moveable inner shaft 711, the moveable inner shaft 711 being moveable relative to the outer shaft 709. When inner shaft 711 is actuated in direction 715, the collapsible frame clamp 713 rotates in direction 715 until firmly securing frame 113a. It should be appreciated that tool 701 includes a collapsible frame clamp associated with each frame 113a-113f. It is preferable that the frames 113a-113f are secured to tool 701 while tool is oriented in a horizontal direction.

Step 313 includes installing the adhesive packs on each frame 113a-113f. For clarity, adhesive film pack 501 is described herein with regards to frame 113f; however, the discussion herein with regard to adhesive pack 501 and frame 113f is equally applicable to the installation of adhesive packs on frames 113a-113e. Referring now to FIGS. 9A, 9B, and 10, adhesive pack 501 is illustrated in stages of installation onto frame 113f, in accordance with step 313 of method 301. As shown in FIGS. 9A and 9B, adhesive pack 501 is installed onto the faying surface of frame 113f. One or more MTC's 509 are optionally installed in the bondline. Each MTC 509 may be installed using an adhesive film square 901. In the illustrated embodiment, square 901 is approximately a one-half inch square piece of adhesive film, preferably of the same material adhesive film as used in adhesive pack 501. A hot-air gun may be used to preheat a portion of frame 113f so that square 901 can be applied to frame 113f. Each MTC 509 is then located against a respective square 907 so that the junction of MTC 509 is located approximately 0.1-0.2 inch inside the bondline. The hot-air gun may also be used to partly heat the bondline surface of frame 113f to promote tackiness between adhesive pack 501 and frame 113f. Adhesive pack 501 is then applied around the bondline surface of frame 113f, as shown in FIG. 10. The adhesive noodle 511 is located along the rim of frame 113f, just outside the bondline surface. Adhesive pack 501 is trimmed along the non-noodle edge, as required.

Figure 11B:
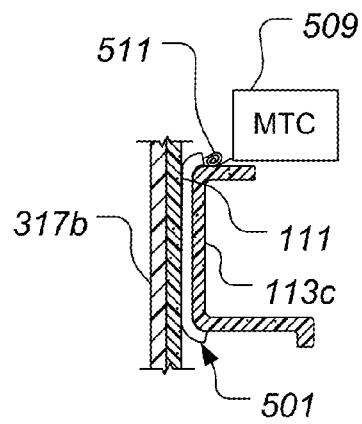
FIG. 11B is a detail view of the bond fixture assembly, taken from FIG. 11A.
Figure 11A:
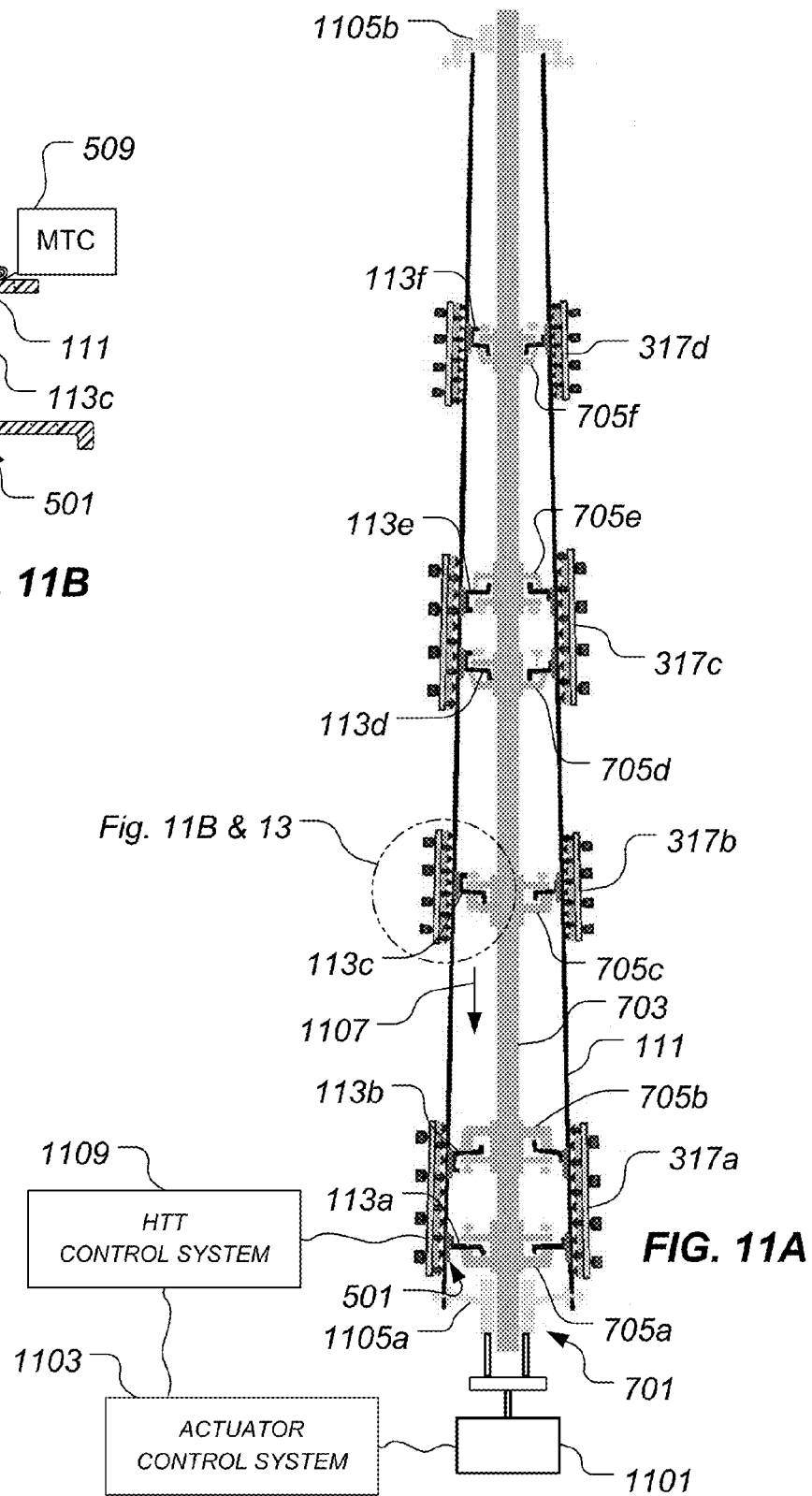
FIG. 11A is a stylized cross-sectional view of bond fixture assembly, according to the preferred embodiment of the present application.

Step 315 includes installing the tailboom skin 111 onto tool 701. Referring to FIGS. 11A and 11B, tailboom skin 111 is located and secured onto tool 701 with tailboom skin fixtures 1105a and 1105b. In the preferred embodiment, tool 701 is configured such that shaft 703 is fixed, along with frames 113a-113f, while tailboom skin 111 is configured to translate relative to shaft 703. In an alternative embodiment, tailboom skin 111 is fixed while shaft 703 is configured to translate relative to shaft 703. In the preferred embodiment, tool 701 is turned vertical before step 317 is performed. An actuator 1101 is operably associated with tool 701 in order to selectively translate tailboom skin 111 and skin fixtures 1105a and 1105b, along a direction 1107 relative to shaft 703. A control system 1103 is configured to dictate the rate of translation of tailboom skin 111, as discussed further herein with regard to step 317. In the preferred embodiment, control system 1103 is a computer with hardware and software configured to efficiently and accurately control not only the translation of tailboom skin 111, but also other steps of smear bonding procedure 317.

Embodiments of the HTT control system 1109 and actuator control system 1103, as well as other systems for operating method 317, can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

Step 317 includes performing the smear bonding procedure in order to create the adhesive bond between frames 113a-113f and tailboom skin 111. Step 317 includes achieving a uniform adhesive smearing and full adhesive cure. The adhesive smearing is provided by translation of the tailboom skin 111 over the fixed frames 113a-113f and adhesive packs 501. The adhesive smearing, as well as the adhesive curing, is facilitated in part by conductive heating through tailboom skin 111, the heat being provided by HTT's 317a-317d. The HTT's 317a-317d are controlled by a HTT control system 1109. HTT's 317a-317d are controlled to first heat the adhesive packs 501 to the desired viscosity, then conducted through the adhesive smearing procedure. HTT's 317a-317d are controlled to subsequently cure the adhesive. Further, during the adhesive smearing and curing procedures, an actuator control system 1103 functions in conjunction with HTT control system 1109. During these procedures, distinct actuation steps and heating/soak phases are used, as described further herein.

Figure 14:
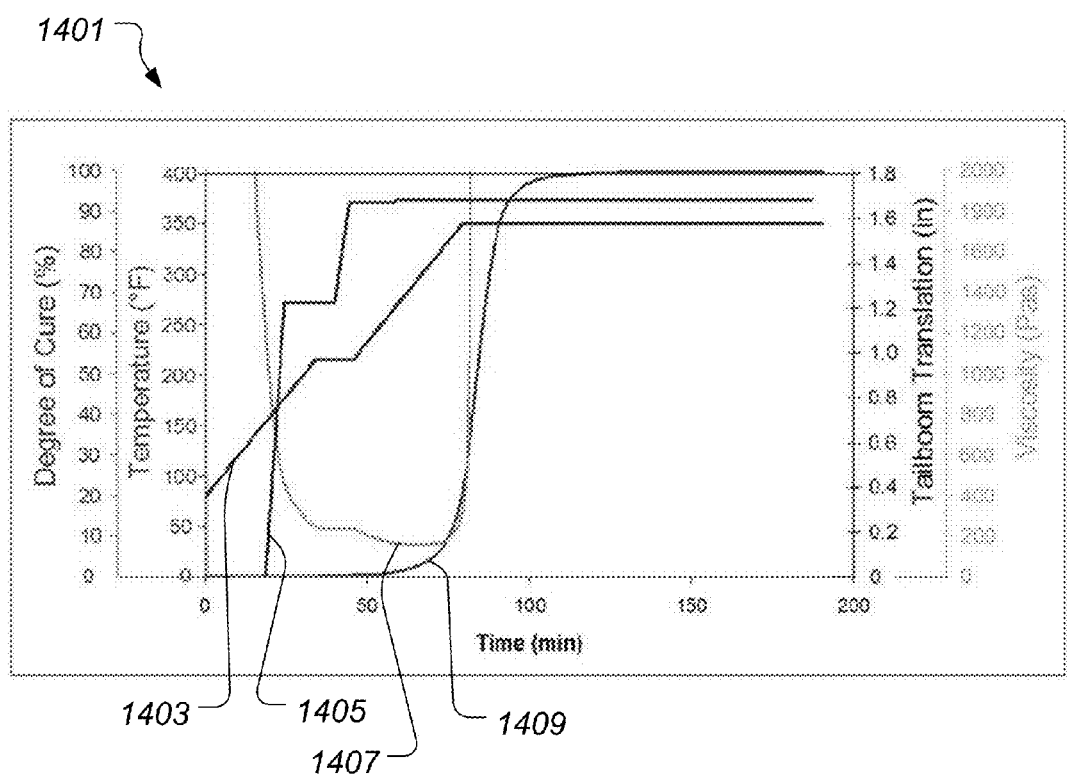
FIG. 14 is a chart graphically illustrating the method, according to the preferred embodiment of the present application.

Referring now also to FIG. 14, a chart 1401 illustrates the relationship between a bondline temperature 1403, a tailboom translation 1405, an adhesive viscosity 1407, and a degree of cure 1409, as a function of time, during step 317.

Figure 12:
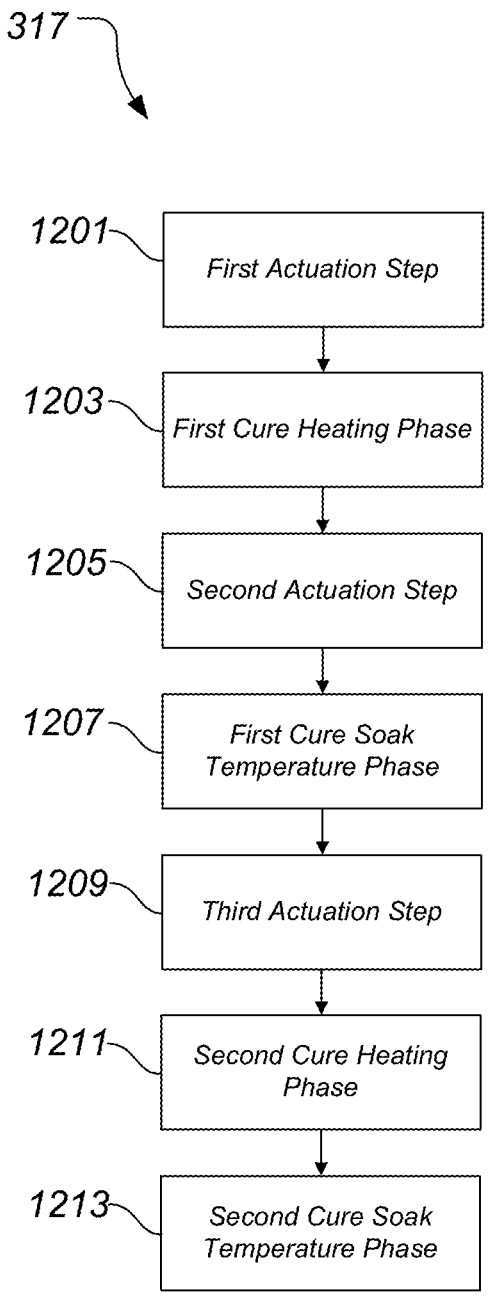
FIG. 12 is a schematic block diagram of the smear bonding procedure, according to the preferred embodiment of the present application.

Referring to now also to FIG. 12, step 317 of method 301 includes a first actuation step 1201 wherein control system 1103 directs actuator 1101 to translate tailboom skin 111 until adhesive pack 501 on each frame 113a-113f is brought into contact with the interior surface of tailboom skin 111.

Step 317 of method 301 further includes a first cure heating phase 1203 wherein the adhesive packs 501 are heated by the HTT's 317a-317d at a heating ramp rate. In the preferred embodiment, the heating ramp rate is approximately 4° Fahrenheit per minute.

Step 317 of method 301 further includes a second actuation step 1205 wherein each adhesive pack 501 is consolidated in order to compact the adhesive packs 501 and remove any trapped air in the bondlines between frames 113a-113f and tailboom skin 111. Consolidation in step 317 occurs by translating tailboom skin 111 relative to frames 113a-113f while the bondlines are at a predetermined temperature such that the outer portions of the adhesive packs 501 have melted into a viscous state. In the preferred embodiment, the predetermined temperature of the bondlines is approximately between 130°-160° Fahrenheit. However, it should be appreciated that the predetermined temperature is implementation specific and that actuation step 1205 may be performed at any temperature at which the outer surfaces of adhesive packs 501 are viscous. In the preferred embodiment, the translation rate of actuation step 1205 is approximately 0.2 inch per minute. The translation proceeds until a predicted smear translation distance remains. For example, if the predicted smear translation distance is 0.45 inch, then the translation in step 1205 terminates when frames 113a-113f are 0.45 inch from the final location of frames 113a-113f, in relation to tailboom skin 111. In the preferred embodiment, the translation distance is approximately 0.55 inch; however, this distance depends in part upon the thickness of each adhesive pack 501, as well the geometric tolerances of frames 113a-113f and tailboom skin 111.

Step 317 of method 301 further includes a first cure soak temperature phase 1207 wherein the heating ramp rate (approximately 4° Fahrenheit per minute) is paused when the average bondline temperature at the predetermined smearing temperature. In the preferred embodiment, the predetermined smearing temperature is approximately 205° Fahrenheit. It should be appreciated that the smearing temperature is implementation specific and depends in part upon the specific adhesive film being used.

Step 317 of method 301 further includes a third actuation step 1209 wherein the tailboom skin 111 is translated until frames 113a-113f reach the predetermined final position on tailboom skin 111. In the preferred embodiment, the smearing translation rate is approximately 0.1 inch per minute and the smearing translation distance is approximately 0.45 inch. Actuation step 1209 includes smearing the adhesive packs 501 at the bondline. Because of the tapered geometry of tailboom skin 111, the translation results in a reduction in relative thickness between frames 113a-113f and tailboom skin 111. The translations also results in mechanical pressure at the bondline while the adhesive packs 501 are viscous and smearing. Once the frames 113a-113f reach the predetermined final position on tailboom skin 111, the smearing translation is concluded.

Step 317 of method 301 further includes a second curing heating phase 1211 wherein the bondlines are heated at a heating rate until the curing temperature is obtained. In the preferred embodiment, the heating rate of heating phase 1211 is approximately 4° Fahrenheit per minute.

Step 317 of method 301 further includes a second cure soak temperature phase 1213 wherein the bondline is cured at a predetermined curing temperature for a predetermined curing time. In the preferred embodiment the predetermined curing temperature is approximately 355° Fahrenheit, while the predetermined curing time is approximately 100 minutes. After the curing time is completed, the HTT's 317a-317d are turned off and the assembly is allowed to cool to room temperature. At the end of cure soak temperature phase 1213, frames 113a-113f are securely bonded to tailboom skin 111.

Referring again to FIG. 3, step 319 of method 301 includes disassembling tailboom 103 from tool 701. In step 319, tailboom skin 111 and frames 113a-113f are decoupled from tool 701. Step 319 also includes the removal of any MTC's 509 in the bondline.

Figure 13:
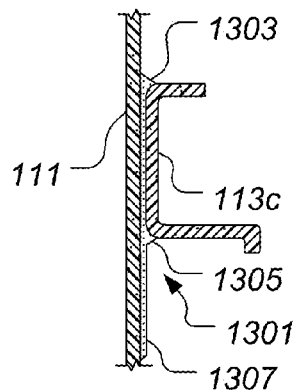
FIG. 13 is a detail view of the bond fixture assembly, taken from FIG. 11A.

Referring to FIG. 13, a cured bondline 1301 between frame 113c and tailboom skin 111 is illustrated in the cured state. The thickness of cured bondline 1301 is thinner than the original thickness of adhesive pack 501 due to the compressing and smearing during smear bond procedure 317. During the smear bond procedure 317, noodle 511 becomes a fillet 1303. Because noodle 511 is located on the leading edge portion during the smear bond procedure 317, noodle 511 provides a volume of adhesive necessary to allow the formation of fillet 1303. Preferably, smear bond procedure 317 also produces a trailing edge fillet 1305 due to the build up of smeared adhesive. Further, smear bond procedure 317 may also produce a residue trail 1307 of adhesive that is left behind. The length of residue trail 1307 is dependent upon the cumulative smearing distance during smear bond procedure 317. Residue trail 1307 can be removed by placing release tape on tailboom skin 111 prior to insertion into tool 701.

Figure 15A:
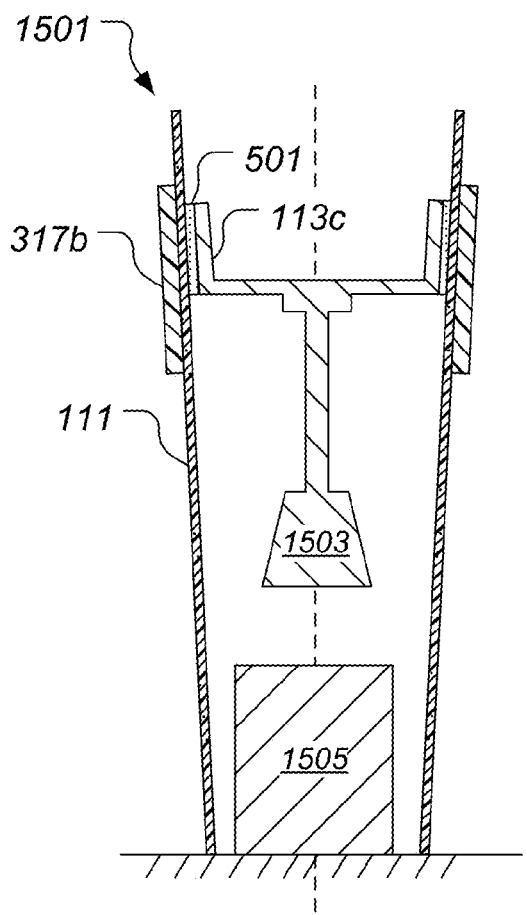
FIGS. 15A and 15B are stylized cross-sectional views of a bond fixture assembly, according to an alternative embodiment of the present application.
Figure 15B:
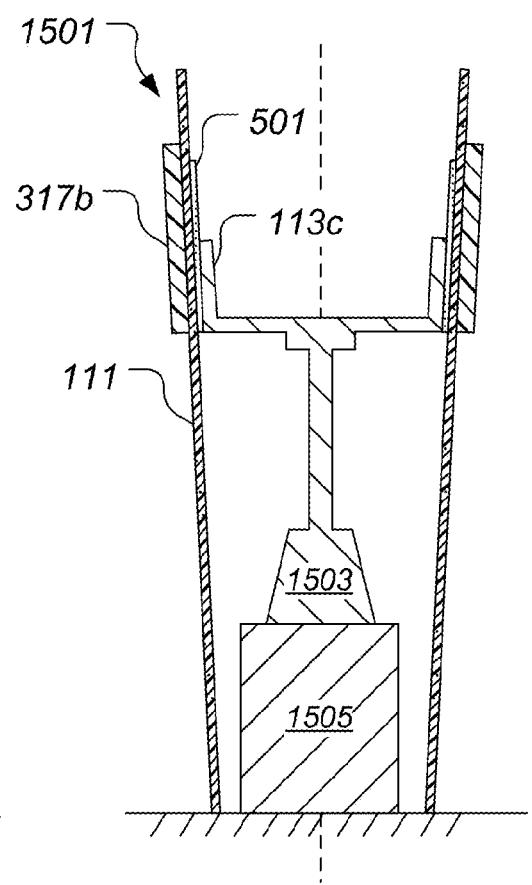

Referring to FIGS. 15A and 15B, an alternative embodiment of method 301 includes using a tool fixture 1501. Tool fixture 1501 includes using a weight 1503 coupled to frame 113c. Weight 1503 can be used in lieu of a mechanical actuator to translate frame 113c relative to tailboom skin 111. A stop 1505 can be used to stop the translation at the desired stop point. Weight 1503 acts to self align frame 113c during the smearing translation. It should be appreciated that even though only a single frame 113c is shown, weight 1503 can be coupled to multiply frames, as shown in FIG. 11A.

Referring to FIGS. 16A and 16B, an alternative embodiment of method 301 includes attaching an external frame 1607 to skin 111. In such an embodiment, the frame 1607 or skin 111 can be translated with a weight 1603 which uses gravity to pull skin 111 down towards a stop 1605. Stop 1605 can be used to stop the translation at the desired stop point. In the illustrated embodiment, HTT 317b can be located between the tool and frame 1607. It should be appreciated that even though only a single frame 113c is shown, weight 1603 can be coupled to multiply frames, as shown in FIG. 11A. Further, it should be appreciated that a mechanical actuator can be used to translate skin 111 in lieu of weight 1603.

Method 301 is described herein regarding a tailboom for an aircraft; however, it should be appreciated that method 301 may be used in a variety of applications. For example, method 301 may be used to bond frame members to a skin of a rocket, an airplane, or other tapered or conical body requiring internal frame members. Further, method 301 may be used in non-conically shaped bodies. For example, method 301 may be used for bonding frame members in an airfoil shaped body, such as a wing member, rotor blade, tail member, to name a few. It should also be appreciated that even though method 301 is described herein with regard to a plurality of frames 113a-113f, method 301 may be performed to bond a single frame member to a skin.

The method of the present application provides significant advantages, including: (1) generating autoclave quality bonds between the frame and skin without the use of an autoclave; (2) using a high temperature cure adhesive film in a non-autoclave environment; (3) using the shearing angle and interfering fit to generate pressure in the bondline; and (4) using large shear displacements with high viscosity film adhesive during the bonding process.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A method of bonding a frame to a skin, the method comprising:
    applying an adhesive pack to a faying surface of the frame;
    securing the frame on a tool, the tool comprising a shaft;
    securing a skin to a skin fixture on the tool;
    performing a smear bonding procedure, the smear bonding procedure comprising:
        translating the skin relative to the frame until the adhesive pack is in contact with an interior surface of the skin;
        applying heat from an exterior of the skin so as to at least partially turn the adhesive pack viscous;
        consolidating the adhesive pack by translating the skin relative to the frame so as to compressively smear the adhesive pack; and
        curing the adhesive pack when the frame is in a final position relative to the skin.

2. The method according to claim 1, wherein the step of applying an adhesive pack to the faying surface of the frame includes heating the frame to promote tackiness between the adhesive pack and the frame.

3. The method according to claim 1, wherein the adhesive pack includes a plurality of adhesive film layers.

4. The method according to claim 1, wherein the adhesive pack includes a noodle formed by rolling up excess of the adhesive film layer, the noodle being configured to form an adhesive fillet between the frame and the skin.

5. The method according to claim 1, wherein compression during the step of consolidating the adhesive packs by translating the skin relative to the frame is produced by the skin being tapered.

6. The method according to claim 1, wherein the skin is a tapered tailboom.

7. The method according to claim 1, wherein at least one of the skin and the frame are of a composite material.

8. The method according to claim 1, wherein the step of securing the frame on a tool includes translating an inner shaft relative to the shaft in order to actuate a locking mechanism so as to secure the frame to the tool.

9. The method according to claim 1, wherein the step of translating the skin relative to the frame is performed using an actuator control system configured to accurately translate the skin fixture and skin while the shaft remains stationary.

10. The method according to claim 1, wherein the step of applying heat from an exterior of the skin comprises selectively controlling a heat transfer tile, the heat transfer tile being located on an outer surface of the skin.

11. The method according to claim 1, wherein the step of applying heat from an exterior of the skin includes using a computer to automatically dictate a heating level applied by a heat transfer tile located on the exterior of the skin.

12. The method according to claim 1, further comprising:
    using a computer to interpret data from a thermocouple located between the frame and the skin.

13. The method according to claim 1, wherein the step of curing the adhesive pack includes applying heat so as to sustain a cure temperature at a curing duration.

14. The method according to claim 1, wherein the adhesive pack includes an adhesive film layer.

15. The method according to claim 1, wherein the adhesive pack includes an adhesive paste layer.

16. The method according to claim 1, wherein the step of applying heat includes applying heat from an exterior of the skin.

17. The method according to claim 1, wherein the step of consolidating the adhesive pack by translating the skin is achieved by a weight coupled to the skin so that gravity acts to translate the skin.

18. The method according to claim 1, wherein the frame is exterior to the skin.

* * * * *